No. 760,809. PATENTED MAY 24, 1904.
S. H. SCHMIDT.
RECIPROCATING STEAM ENGINE.
APPLICATION FILED JAN. 14, 1904.
NO MODEL.

Witnesses:
C. D. Kesler.
James L. Norris, Jr.

Inventor
Sigurd H. Schmidt
By James L. Norris.
Atty.

No. 760,809. Patented May 24, 1904.

UNITED STATES PATENT OFFICE.

SIGURD H. SCHMIDT, OF MATAWAN, NEW JERSEY.

RECIPROCATING STEAM-ENGINE.

SPECIFICATION forming part of Letters Patent No. 760,809, dated May 24, 1904.

Application filed January 14, 1904. Serial No. 189,051. (No model.)

*To all whom it may concern:*

Be it known that I, SIGURD H. SCHMIDT, a citizen of the United States, residing at Matawan, in the county of Monmouth and State of New Jersey, have invented new and useful Improvements in Reciprocating Steam-Engines, of which the following is a specification.

This invention relates to reciprocating steam-engines, and especially to the cylinders, pistons, and valves thereof, and has for its object to provide an improved construction and arrangement of said parts by means of which an efficient and economical application of the steam to the work to be done is accomplished. The parts are few in number and comprised in a relatively small space and compact manner, and waste and loss of steam is prevented.

To these ends my invention consists in the features and in the construction, arrangement, and combination of parts hereinafter described, and particularly pointed out in the claims following the description, reference being had to the accompanying drawings, forming a part of this specification, wherein—

Figure 1:
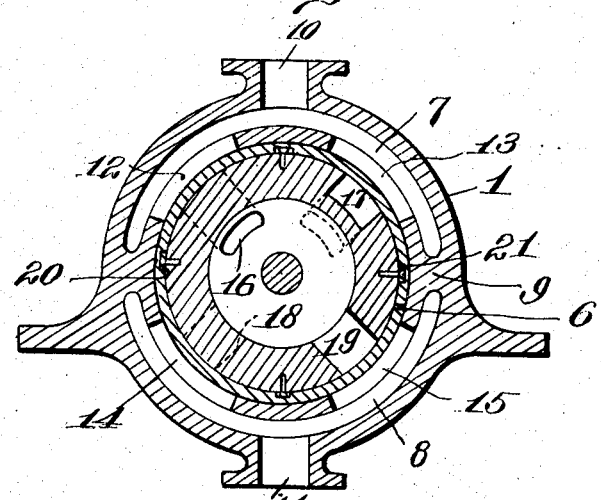
Figure 2:
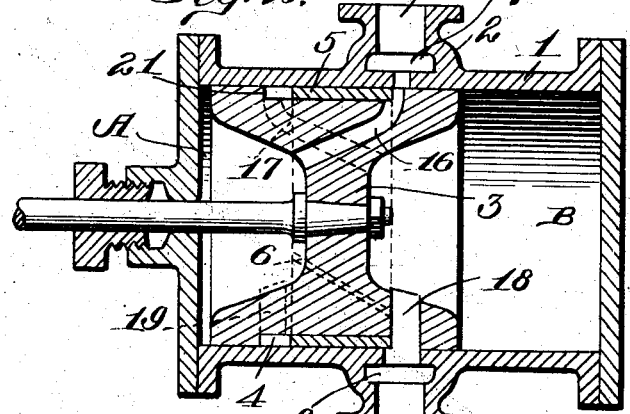
Figure 3:
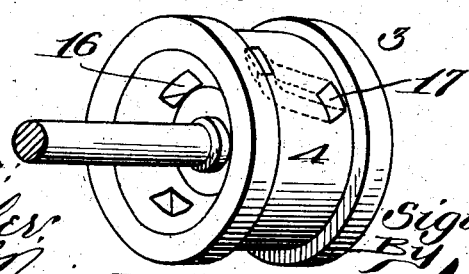

Figure 1 is a transverse section of the cylinder and piston. Fig. 2 is a longitudinal sectional view of the same, and Fig. 3 is a perspective view of the piston.

Referring to the drawings, the numeral 1 indicates a cylinder of a reciprocating steam-engine closed at its opposite ends and provided on its exterior midway between its ends with an annular enlargement 2. Arranged to reciprocate in the cylinder is a piston 3, in the periphery of which is formed an annular groove 4. Seated in said groove is a ring 5, split diagonally, as at 6, after the well-known manner of a metallic packing-ring, whereby said ring will have a tendency to expand and make a tight joint between itself, the piston, and the interior of the cylinder. As shown, said ring is of less width than the groove 4, and owing to its expansibility it hugs the interior of the cylinders closer in frictional contact than the piston itself. Thus the ring will only move with the piston when one of the shoulders of the groove engages a corresponding end of edge of the ring. The said ring constitutes a valve which operates in the manner which will hereinafter be explained.

Formed in the enlargement 2 are two approximately semi-annular ducts or channels 7 and 8, which are separated at their adjacent ends by solid portions 9 of the cylinder. Communicating with the channel 7 is a steam-inlet 10 and communicating with the channel 8 is an exhaust-outlet 11. Formed in that portion of the periphery of the cylinder which is surrounded by the annular enlargement 2 are four ports, respectively numbered 12, 13, 14, and 15, the ports 12 and 13 constituting steam-inlet ports and the ports 14 and 15 exhaust-ports. Formed in the piston 3 are two diagonal ports, respectively numbered 16 and 17, which at their outer ends communicate with the opposite end portions of the groove 4 in the piston and at their inner ends respectively open into the ends A and B of the cylinder on either side of the piston. The ports respectively numbered 18 and 19 communicate with the opposite end portions of the groove 4 on the lower side of the piston. Attached to the periphery of the grooved portion of the piston by screws or other suitable fastenings are four ribs 20, which are arranged between the steam and exhaust ports and are seated in grooves 21, formed in the inner side of the ring-valve 5, the arrangement being such that the valve is movable on said ribs, while at the same time said ribs prevent any escape of the steam from one port to another between the periphery of the piston and the inner side of the valve.

The operation of my invention is as follows: Let it be assumed that the parts are in the position shown in Fig. 2 of the drawings and that the piston is about to move to the right on its rebound stroke—that is to say, toward the end B of the cylinder. The steam will be admitted at the inlet 10 to the duct 7 and will pass through the ports 13 and 16 to the end A of the cylinder, and the piston will thus be moved to the right by the impact and head of the steam. At the same time the exhaust-steam on the right-hand side of the piston will escape by the exhaust-ports 18 and 14 and duct 8 through the exhaust-outlet 11. The piston will now move forward to the right, the valve 5, owing to its frictional contact with the interior of the cylinder, remaining stationary until the shoulder 21 of the piston engages the adjacent end of the valve. The valve will now move forward with the piston and will close the inlet-port 12 and the exhaust-port 14, the greater portion of the exhaust-steam having by this time been exhausted from the compartment B of the cylinder. The piston will now continue to be impelled forward toward the right by the expansion of the steam in the compartment A of the cylinder until it reaches or nearly reaches the right-hand end of the cylinder. When it has reached said end, the piston will rebound slightly, thus opening the port 13 and exhaust-port 15, whereupon the steam will be admitted to the end B of the cylinder through the duct 7 and steam-ports 13 and 17 and will be exhausted from the end A of the cylinder through the exhaust-ports 15 and 19, when the action will be the same as that before described.

From the foregoing it will be seen that the steam is cut off before the piston reaches the end of its stroke, and the steam will then continue to operate upon the piston by expansion, this occuring when the piston has moved a distance equal to the difference between the length of the groove and the length of the ring and the breadth of the steam-ports.

It will be evident to those skilled in the art that some of the details of construction of my invention may be altered without departing from the spirit thereof, and I therefore wish it to be understood that I do not limit myself to the details of construction excepting as hereinafter specifically set forth in the claims.

Having described my invention, what I claim is—

1. In a steam-engine, the combination with a cylinder having two steam-ports and two exhaust-ports, of a piston grooved on its periphery, steam and exhaust ports in the piston adapted to register with the corresponding ports in the cylinder, and an annular valve of less width than said groove and movably seated in the latter for controlling said ports, substantially as described.

2. In a steam-engine, the combination with a cylinder provided intermediate its ends on opposite sides with two steam-ports and two exhaust-ports, of a piston grooved on its periphery, steam and exhaust ports in the piston adapted to register with the corresponding ports in the cylinder, an expansible annular valve of less width than the groove and movably seated in the latter for controlling said ports, said valve fitting the cylinder with tighter frictional contact than the piston, substantially as described.

3. In a steam-engine the combination with a cylinder provided intermediate its ends on opposite sides with two steam-ports and two exhaust-ports, of a piston grooved on its periphery, steam and exhaust ports in the piston adapted to register with the corresponding ports in the cylinder, and an annular valve of less width than the groove and movably seated in the latter for controlling said ports, said valve being constructed to fit the cylinder with greater frictional contact than the piston, substantially as described.

4. In a steam-engine, the combination with a cylinder provided intermediate its ends on opposite sides with two steam-ports and two exhaust-ports, of a piston grooved peripherally intermediate its ends, said piston being provided with two diagonal steam-ports adapted to respectively register with the steam-ports in the cylinder and leading through the opposite ends of the piston, two exhaust-ports in the piston adapted to alternately register with the exhaust-ports in the cylinder, and an expansible annular valve of less width than the groove and seated in the latter for controlling said ports, substantially as described.

5. In a steam-engine, the combination with a cylinder provided intermediate its ends on opposite sides with two steam-ports and two exhaust-ports, of a piston grooved peripherally intermediate its ends, said piston being provided with two diagonal steam-ports adapted to respectively register with the steam-ports in the cylinder and leading through the opposite ends of the piston, two exhaust-ports in the piston adapted to register with the exhaust-ports in the cylinder, an expansible annular valve of less width than the groove and seated in the latter for controlling said ports, and longitudinal ribs on the grooved periphery of the piston and movably seated in corresponding grooves in the interior of the annular valve, substantially as described.

6. In a steam-engine, the combination with a cylinder provided exteriorly intermediate its ends with a circumferential enlargement having formed therein on its opposite sides two approximately semicircular ducts, two steam-ports in the cylinder communicating with one of said ducts, two exhaust-ports in the cylinder communicating with the other of said ducts, a steam-inlet and exhaust-outlet connected respectively with said ducts, a piston grooved circumferentially between its ends, two oppositely-inclined ports extending from the ends of said groove to the opposite ends of the piston, two exhaust-ports in the piston leading from the opposite ends of the piston and adapted to communicate with the exhaust-ports in the cylinder, and an expansible annular valve of less width than the said groove and seated in the latter for controlling the ports, substantially as described.

In testimony whereof I have hereunto set my hand in presence of two subscribing witnesses.

SIGURD H. SCHMIDT.

Witnesses:
KARL WATHIASE,
THOGR R. ESKESEN.